L. G. COMPARET.
COFFEE AND TEA-POT.
No. 183,448.                    Patented Oct. 17, 1876.
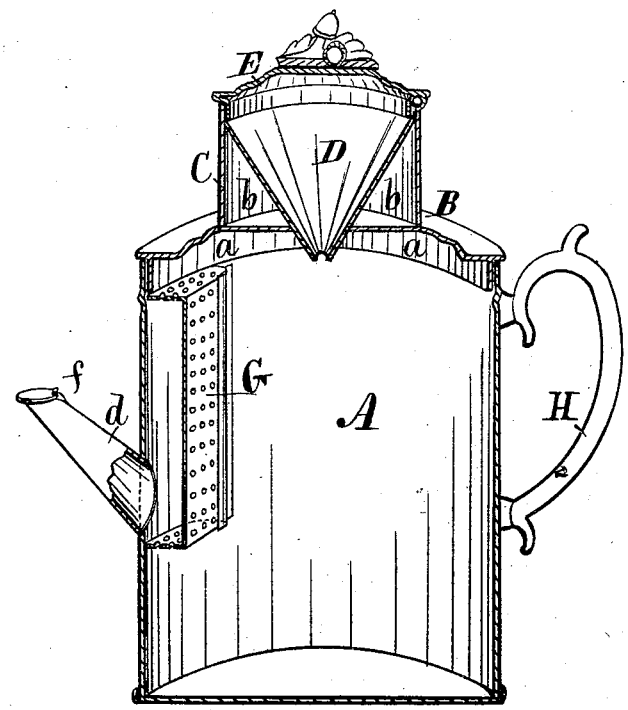

UNITED STATES PATENT OFFICE.

LEWIS G. COMPARET, OF DES MOINES, IOWA.

IMPROVEMENT IN COFFEE AND TEA POTS.

Specification forming part of Letters Patent No. 183,448, dated October 17, 1876; application filed May 1, 1875.

To all whom it may concern:

Be it known that I, LEWIS G. COMPARET, of Des Moines, in the county of Polk and State of Iowa, have invented certain Improvements in Coffee and Tea Pots, of which the following is a specification:

The object of my invention is to furnish a coffee and tea pot of improved construction, to simplify, facilitate, and economize in the making of good coffee and tea.

It consists, first, in a movable cover having a dome, and in the dome a condensing-chamber, a funnel, and a dead-air space; second, in the arrangement of the pouring-spout, the movable filter, and the movable cover relative to each other, to prevent coffee-grounds or tea-leaves from getting into the spout and cups in pouring, all as hereinafter fully set forth.

My drawing is a perspective view of a half-section of my coffee-pot, and illustrates the construction and operation thereof.

A represents a vessel of cylindrical form, which may vary in size as desired. B is a movable cover. $a\ a$ is the rim of the movable cover, extending into the vessel A, to form a steam-tight joint, and to engage the movable filter. C is a dome rigidly secured to the top of the movable cover B. D is a funnel fitted at its top to the inside of the dome C, and its open bottom extends through the movable cover B. $b\ b$ is an annular chamber and dead-air space, formed in the dome C by means of the funnel D. E is a hinged cover on top of the dome C. G is the movable filter, sliding in grooves fixed on the inside of the vessel A. It extends from the rim $a\ a$ of the movable cover B to a point below the spout $d$, which is covered by a suitable cap, $f$. H is a handle attached to the vessel A on the opposite side from the spout $d$.

In the practical operation of my improved coffee-pot the movable cover B is removed, and roasted and ground coffee or tea, together with some water, is placed in the vessel A. The quantity of coffee and water will vary to suit the size of the vessel and the number of persons to be served. The cover B, carrying the dome C and funnel E, is then put on to close the vessel A. In pressing the cover on, its rim $a\ a$ engages the filter G and presses it down, and retains it in its proper place to keep the opening to the spout $d$ covered, and thereby prevents coffee-grounds or tea-leaves from passing into and through the spout.

I am aware that movable filters have been used to cover a spout-opening; but it frequently happens that the filter is not properly adjusted, and allows the spout-opening to be partly uncovered. By my arrangement of the spout, the filter, and the rim on the cover relative to each other, the putting on of the cover adjusts and holds the filter in its proper place to perform its functions satisfactorily at all times.

When the spout $d$ and dome B are closely covered the steam and aroma will rise into the funnel and condensing-chamber D, and as the steam condenses the aroma is returned with the condensed steam to the vessel A, and no part of the valuable properties is allowed to escape. Water can be added to weaken the decoction and to increase the quantity, by pouring through the funnel D whenever desired, by simply opening the hinged dome-cover E.

I am also aware that a condensing-chamber has been formed in the movable cover and dome of a coffee-pot; but I claim that my manner of forming a condensing-chamber so that it can be used as a funnel is novel and greatly advantageous.

I claim as my invention—

1. In a coffee and tea pot, the movable cover B, carrying the fixed dome C, the hinged dome-cover E, and the inclosed and fixed funnel and condensing-chamber D, substantially as and for the purposes shown and described.

2. The movable cover B, having a rim, $a\ a$, and the movable filter G, adapted to slide over the opening of the spout $d$, arranged and combined substantially as and for the purposes shown and described.

LEWIS G. COMPARET.

Witnesses:
ARTHUR WRIGHT,
R. G. ORWIG.